United States Patent
Jiang et al.

(10) Patent No.: US 12,428,036 B2
(45) Date of Patent: Sep. 30, 2025

(54) SCENARIO-BASED TRAINING DATA WEIGHT TUNING FOR AUTONOMOUS DRIVING

(71) Applicant: Baidu USA LLC, Sunnyvale, CA (US)

(72) Inventors: Shu Jiang, Sunnyvale, CA (US); Yu Cao, Sunnyvale, CA (US); Weiman Lin, Sunnyvale, CA (US); Szu Hao Wu, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 224 days.

(21) Appl. No.: 17/810,012

(22) Filed: Jun. 30, 2022

(65) Prior Publication Data
US 2024/0001966 A1   Jan. 4, 2024

(51) Int. Cl.
  *G06V 10/82*   (2022.01)
  *B60W 60/00*   (2020.01)
  *G06V 20/58*   (2022.01)

(52) U.S. Cl.
  CPC ....... *B60W 60/00276* (2020.02); *G06V 10/82* (2022.01); *G06V 20/58* (2022.01); *B60W 2554/4046* (2020.02)

(58) Field of Classification Search
  CPC .... B60W 60/00276; B60W 2554/4046; G06V 20/58; G06V 10/82
  USPC ........................................................ 701/23
  See application file for complete search history.

(56) References Cited

U.S. PATENT DOCUMENTS

| | | | |
|---|---|---|---|
| 11,726,862 B1* | 8/2023 | Maurice | G06F 11/0751 714/15 |
| 2019/0361439 A1* | 11/2019 | Zeng | G06V 20/56 |
| 2019/0361456 A1* | 11/2019 | Zeng | G01C 21/20 |
| 2021/0278852 A1* | 9/2021 | Urtasun | G06T 17/05 |
| 2021/0403034 A1* | 12/2021 | Lapin | B60W 60/0027 |

(Continued)

FOREIGN PATENT DOCUMENTS

DE   102017128082 A1 *  5/2019

OTHER PUBLICATIONS

Wei Wang, Bayesian Optimization Concept Explained in Layman Terms, Mar. 18, 2020, Towards Data Science (Year: 2020).*

(Continued)

*Primary Examiner* — Matthias S Weisfeld
(74) *Attorney, Agent, or Firm* — WOMBLE BOND DICKINSON (US) LLP

(57) ABSTRACT

According to various embodiments, the disclosure discloses systems, methods and media for formulating training datasets for learning-based components in an autonomous driving vehicle (ADV). In an embodiment, an exemplary method includes allocating training datasets for training a learning-based model in the ADV, each training dataset being allocated to one of multiple predefined driving scenarios; determining a weight of each training dataset out of the training datasets; and optimizing the weight of each training dataset in one or more iterations according to a predetermined algorithm until a performance of the learning-based model reaches a predetermined threshold. The predetermined algorithm is one of a random search algorithm, a grid search algorithm, or a Bayesian algorithm.

17 Claims, 10 Drawing Sheets

(56) References Cited

U.S. PATENT DOCUMENTS

2022/0327840 A1* 10/2022 Ambeck-Madsen .. G06V 10/62

OTHER PUBLICATIONS

Sanghyun Woo, CBAM: Convolutional Block Attention Module, 2018, ECCV The Computer Vision Foundation (Year: 2018).*

Jinyun Zhou et al., "Exploring Imitation Learning for Autonomous Driving with Feedback Synthesizer and Differential Rasterization", 2021 IEEE/RSJ International Conference on Intelligent Robots and Systems (IROS), pp. 1450-1457, Sep. 27-Oct. 1, 2021, Prague, Czech Republic.

* cited by examiner

SCENARIO-BASED TRAINING DATA WEIGHT TUNING FOR AUTONOMOUS DRIVING

TECHNICAL FIELD

Embodiments of the present disclosure relate generally to autonomous driving vehicles. More particularly, embodiments of the disclosure relate to scenario-based training data weight tuning for learning-based components in autonomous driving vehicle.

BACKGROUND

An autonomous driving vehicle (ADV), when driving in an automatic mode, can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An ADV can include rule-based modules to perform various functionalities to enable the vehicle to drive automatically. However, over the past years, learning-based components have begun to be incorporated into these modules to allow the modules to learn from historical driving data. Each of these learning-based components, once trained, ideally should be able to handle each driving scenario with the same high-quality performance. To achieve that goal, training datasets for the learning-based component need to have desired weights so that a driving scenario are not allocated with an excessive amount of training data, which may result in an overfitting problem for that driving scenario and thereby a performance degradation.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
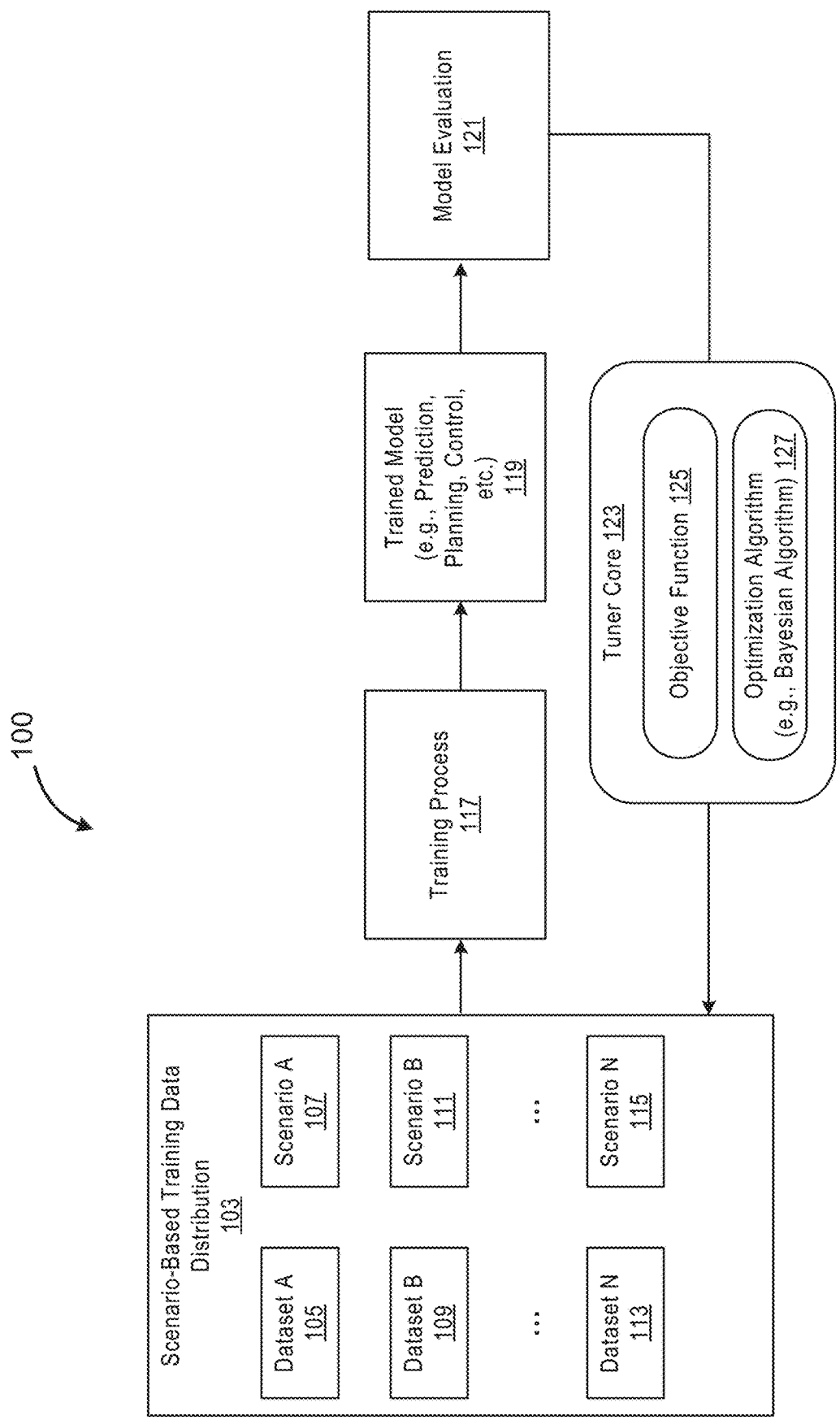
FIG. 1 illustrates a framework for tuning weights of training datasets for different scenarios in training a learning-based model in an ADV according to an embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to various embodiments, the disclosure discloses systems, methods and media for formulating training datasets for learning-based components in an autonomous driving vehicle (ADV). In an embodiment, an exemplary method includes allocating training datasets for training a learning-based model in the ADV, each training dataset being allocated to one of multiple predefined driving scenarios; determining a weight of each training dataset out of the training datasets; and optimizing the weight of each training dataset in one or more iterations according to a predetermined algorithm until a performance of the learning-based model reaches a predetermined threshold. The predetermined algorithm is one of a random search algorithm, a grid search algorithm, or a Bayesian algorithm.

The learning-based model can perform one of a variety of autonomous driving functionalities, for example, perception, planning, prediction, location, and control, and each learning-based component can be used as part of a corresponding rule-based module to provide additional constraints or in lieu of the corresponding rule-based module. In some embodiments, the disclosure uses a learning-based planner as an example to illustrate the various embodiments of the invention. A person of ordinary skill in the art would appreciate that the embodiments described herein can be generalized to other learning-based components in an autonomous driving vehicle with or without modification.

Embodiments of the invention can be used to find proper ratios for training datasets to be allocated to different driving scenarios and to allocate additional training data to the different driving scenario in accordance with the ratios, so that a learning-based component does not experience performance degradation in one or more driving scenarios due to an over-allocation of training data to the one or more driving scenarios.

As an illustrative example, a learning-based is to be trained for 10 driving scenarios, including a driving scenario of "passing a slow vehicle". If training data allocated to the driving scenario during training exceeds a desired weight threshold, a vehicle equipped with the learning-based planner trained using the training data may experience performance degradation due to overfitting. As a result, the vehicle may decide to pass a slow vehicle even though it would be more efficient to just follow the vehicle.

Thus, once a ratio for training data allocated to each driving scenario is found through an optimization process, the ratio needs to be maintained such that if training data is increased for one scenario, training data for all the other driving scenarios also need to be increased according to their respective ratios (also referred to weights in the disclosure).

In an embodiment, each of the one or more iterations can include receiving a performance score of the learning-based model; comparing the performance score against the predetermine threshold; and in response to determine that the performance score is less than the predetermined threshold, adjusting the weight of each of one or more of the plurality of training datasets.

In one embodiment, each driving scenario can be defined by map information, traffic conditions, driving behaviors of an ego vehicle, and driving behaviors of surrounding vehicles. The driving scenarios in the disclosure can be of different categories, such as cruising, junction, static interaction scenario, and dynamic interaction.

In one embodiment, when the learning-based model is a learning-based planner, the network architecture of the learning-based model can include a convolutional neural network (CNN) backbone with a branch of attention module, a long short term memory (LSTM) decoder, and a differential rasterizer module. Inputs to the learning-based model for each of the plurality of driving scenarios includes a bird's eye view (BEV) representation with multiple channels by scene rasterization, and outputs for the learning-based model can be planned trajectories in a time domain.

The embodiments described above are not exhaustive of all aspects of the present invention. It is contemplated that the invention includes all embodiments that can be practiced from all suitable combinations of the various embodiments summarized above, and also those disclosed below.

Scenario-Based Training Data Weight Distribution

FIG. 1 illustrates a framework 100 for tuning weights of training datasets for different scenarios in training a learning-based model in an ADV according to an embodiment.

In an embodiment, the learning-based model can be integrated into one of an existing rule-based autonomous driving modules, such as a planning module, a prediction module, or a perception module, or can replaced one of those autonomous driving modules in some instances. When a learning-based model is integrated into a rule-based module in the ADV, the ADV can take advantage of the benefits of both a rule-based component and a learning-based component. Take the planning module as an example, the planning module can be rule-based, and can include a learning-based planner. Thus, the planning module can take advantage of both the rule-based planning portion and the learning-based portion. The rule-based portion can formulate motion planning as constrained optimization problems, and is reliable and interpretable, but its performance heavily depends on how well the optimization problems are formulated with parameters. These parameters are designed for various purposes, such as modeling different scenarios, balancing the weights of each individual objective, and thus require manual fine-tuning for optimal performance. On the other hand, the learning-based portion can learn from the massive amount of human demonstrations to create human-like driving plans, thus avoiding the tedious design process of setting rules and constraints.

In an embodiment, the tuning framework 100 can include a training data input module 103, a model training process 117, a trained model 119, a model evaluation module 121, and a tuner core 123.

The training data input module 103 can used to allocate and adjust sizes of training datasets for different driving scenarios. As shown in FIG. 1, each of driving scenario A 107, driving scenario B 111, and driving scenario N 115 can be initially allocated with training dataset A 105, training dataset B 109, and training dataset N 113. Each of the training datasets 105, 109, and 113 includes data points for the corresponding driving scenario. These data points can be extracted from driving data demonstrated by human drivers who drive self-driving test vehicles.

In an embodiment, as used herein, a size of a training dataset refers to a number of data point in the training dataset. Each data point in a training dataset for the corresponding scenario can include a bird's eye view (BEV) representation with multiple channels by scene rasterization.

In an embodiment, the training process 117 is a process used to train a learning-based model 119. During the training process 117, a variety of training models can be used to train the learning-based model.

In an embodiment, the model evaluation module 121 can be an autonomous driving simulator, such as the Apollo Dreamland simulator from BAIDU. The model evaluation module 121 can use autonomous driving test scenarios specifically created for evaluating fundamental driving capabilities of an ADV. The testing scenarios can be hand-crafted by scene designers or taken from logs from driving data that is separate from the training data used to train the learning-based model 119; and can use a set of evaluation metrics to evaluate the performance of the trained model 119.

In an embodiment, the trained model 119 can be used as a learning-based component for perception, prediction, planning, control, and other autonomous driving functionalities. Different evaluation metrics can be used to evaluate the performance of the learning-based model 119 depending on the types of autonomous driving functionalities that the learning-based model 119 is configured to perform.

In this disclosure, in some embodiments, the learning-based model 119 is a learning-based planner for the purpose of illustration. In those embodiments, the learning-based model can be evaluated based on a safety score and a comfort score. The safety score can be based on a set of safety-related metrics, including collision, off-road, speeding, traffic-light violation, timely arrival at the scheduled destination, etc. When any of them is violated, the performance is graded as a failure, and the safety score is 0. If none of the above metrics is violated, the safety score can be set to a predetermined value, e.g. 80.

In one embodiment, the comfort score is calculated based on how similar the driving states of the agent equipped with the learning-based planner are to human drivers. The comfort score can be based on one or more of the following evaluation metrics: a longitudinal jerk ratio, lateral jerk ratio, a longitudinal acceleration ratio, and a lateral acceleration ratio, a longitudinal deceleration ratio, a lateral deceleration ration, a distance to boundaries ratio, a distance to obstacle ratio, and a time to collision ratio. The comfort score can be a weighted score based on the above evaluation metrics.

In one embodiment, each of the safety score and the conform score can be computed based on the performance of an agent (e.g., a dynamic model in a simulation platform) in all the driving scenarios 107, 111, and 115.

The evaluation module 121 can then calculate a total performance score based on the safety score and the comfort score using a predetermined algorithm that specifies a weight for each of the safety score and the comfort score, and compare the total performance score against a predetermined threshold score.

In an embodiment, the tuner core module 123 can include an objective function 125 to be optimized and an optimization algorithm 127 used to optimize the objective function

125. The objective function 125 can be expressed as x*=arg min f(x), wherein x∈X. In the above equation, f(x) represents an objective cost to minimize, x* is a set of parameters representing weights of training dataset allocated to the driving scenarios 107, 111 and 115, and X is the search space from which parameters can be drawn.

In an embodiment, the search space can include multiple sets of weights for the driving scenarios 107, 111 and 115. For example, the search space can include three sets of weights (0.1, 0.5, 0.4; 0.2, 0.2, 0.6; and 0.2, 0.1, 0.7) for the three driving scenarios 107, 111, and 115, and each set of weights represents of a set of ratios, each ratio being a percentage of data points in one of the training datasets 105, 109 and 113 out of a total number of data points in all the training datasets 105, 109 and 113.

In an embodiment, the optimization algorithm 127 can be one of a grid search, random search, or Bayesian search. The tuner core 123 can be configured to find the set of weights that minimizes the cost to or below a predetermined threshold value. When a set of weights is found to minimize the cost of the objective function to or below the threshold value, the learning-based planner trained using training datasets allocated in accordance with the set of weights would have the best performance score.

In an embodiment, one or multiple iterations of the same process can be performed to find the set of desired weights, and each iteration can include adjusting the weights of training datasets 105, 109, and 113 for the driving scenarios 107, 111, and 115; train or retrain the trained model 119 using the training process 117; evaluate the trained model 119; and determine whether the performance of the trained model 119 has reached the predetermined threshold.

Figure 2:
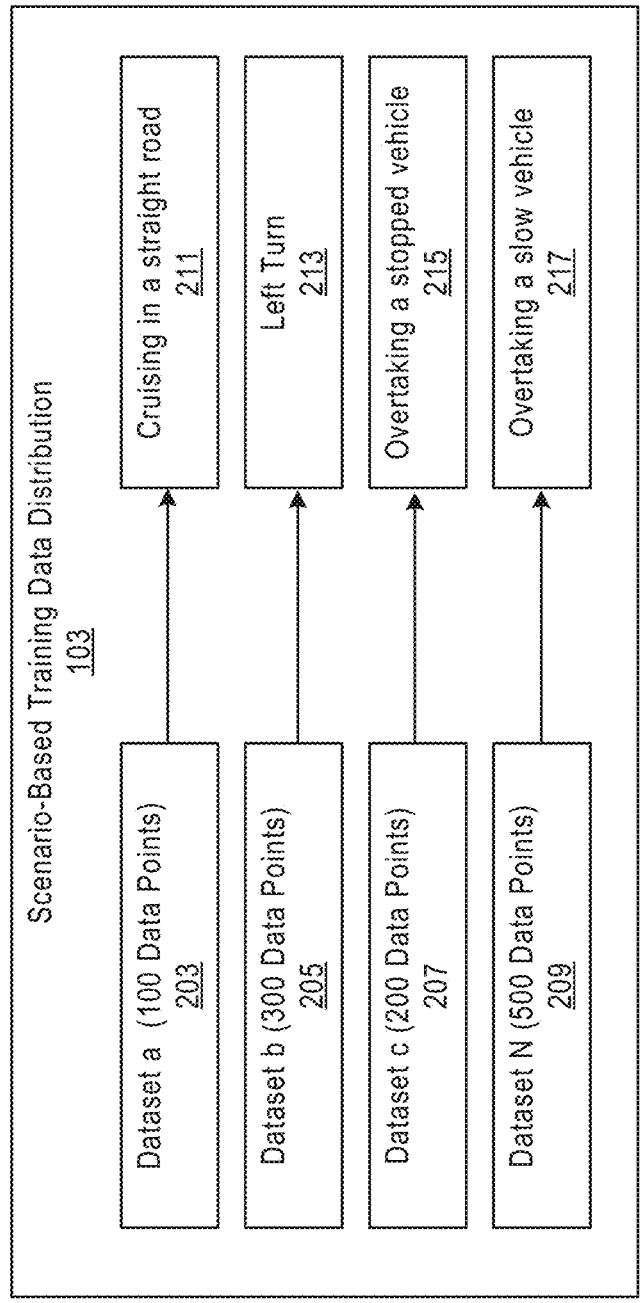
FIG. 2 illustrates an example of an initial allocation of data points to different driving scenarios according to an embodiment.

FIG. 2 illustrates an example of an initial allocation of data points to different driving scenarios according to an embodiment. As shown above, the training data distribution module 103 has initially allocated dataset a 203 with 100 data points to the driving scenario 211 of cruising in a straight road without traffic participants, dataset b 205 with 300 data points to the driving scenario of left turn 213, dataset c 207 with 200 data points to the driving scenario of overtaking a stopped vehicle 215, and dataset N 209 with 500 data points to the driving scenario of overtaking a slow vehicle 217.

Each of the driving scenarios 211, 213, 215, and 217 can be extracted or handcrafted from historical driving data collected by self-driving vehicles that were driven by human drivers, and can be defined by map information, traffic conditions, driving behaviors of an ego vehicle, and driving behaviors of surrounding vehicles. Additional driving scenarios that are not shown in FIG. 2 can include cruising in a curved road without traffic participants, right turn, U turn, stop before a traffic signal, etc.

In an embodiment, the initial training data weights can be adjusted or optimized until a threshold performance score of the trained model is achieved after one or more iterations as described in FIG. 1.

Figure 3:
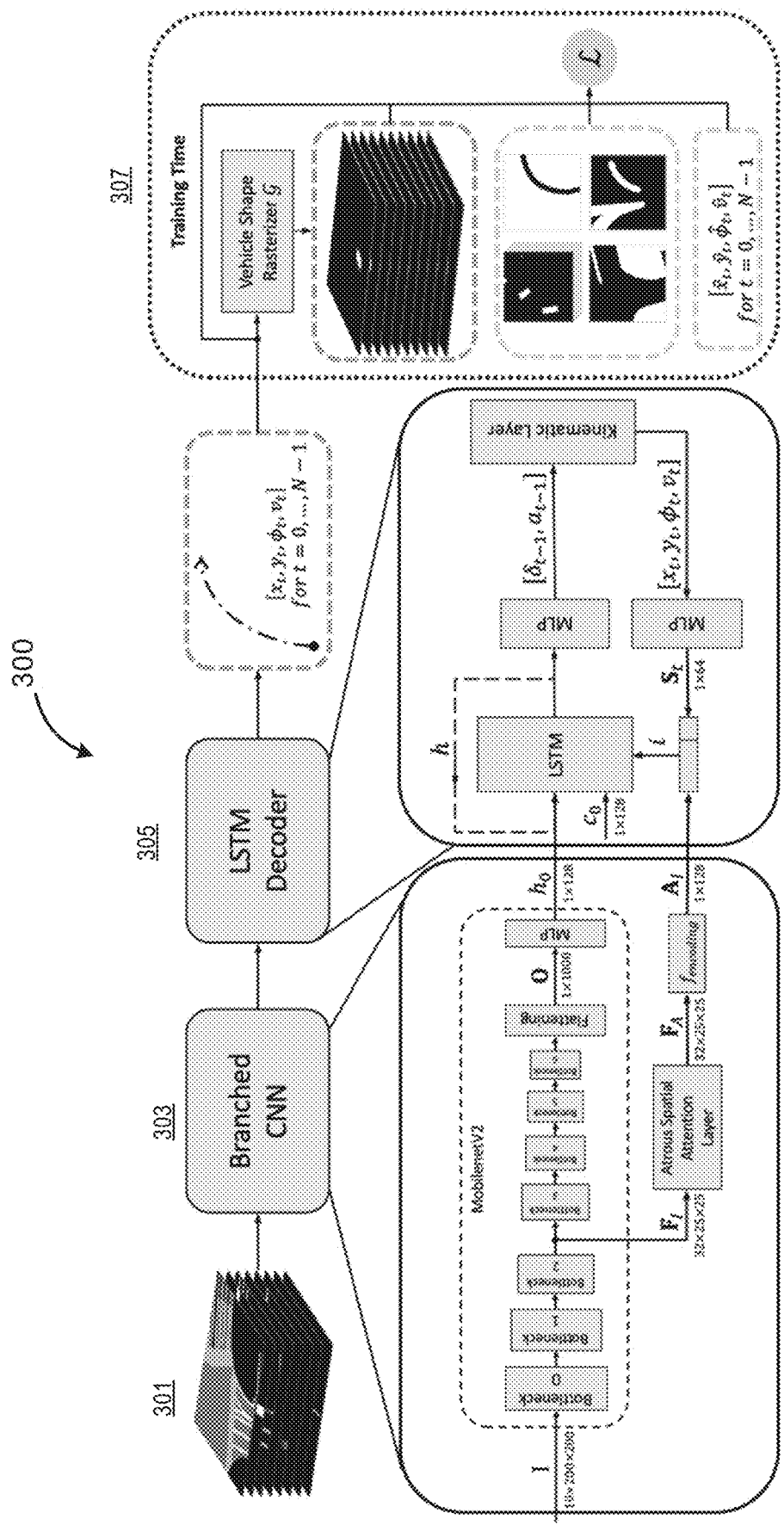
FIG. 3 illustrates an example of a network architecture for a learning-based model in an embodiment.

FIG. 3 illustrates an example of a network architecture 300 for a learning-based model in an embodiment. More specifically, the figure illustrates a network architecture of a learning-based planner, which can be part of a rule-based planning module to put additional constraints, or can replace the rule-based planning module in an ADV.

As shown in FIG. 3, the network structure 300 can include a convolutional neural network (CNN) backbone 303 with a branched spatial attention structure, a long short term memory (LSTM) decoder 305 with a kinematical layer, and a vehicle shape differential rasterizer 307.

The CNN backbone 303 can be a MobileNetV2, whose output features are passed through a multilayer perceptron (MLP) layer, producing flattened feature output h0, which is the initial hidden state of the LSTM decoder 305. Further, to lighten the computation workload, intermediate features F/from the CNN backbone 303 instead of raw image channels are fed to the spatial attention module, which is stemmed from intermediate features of the CNN backbone 303.

The LSTM decoder 305 can take feature embeddings from the CNN backbone 303 as inputs and can generate planned trajectories in a time domain as outputs. The differential rasterizer module 307 can be appended to the LSTM decoder 305 during training to rasterize output planned trajectories into images and finally feeding them to a loss function.

As further shown in FIG. 3, inputs 301 to the network architecture 300 can include top-down (or bird's eye view) image representations of the environment that incorporates both static and dynamic information from a HD map; and data from perception systems of self-driving vehicle used to collected training data.

In one embodiment, the inputs 301 to the network architecture 300 can include rasterized scenes in a bird's eye view (BEV) as multi-channel images. The rasterized scenes can include an agent (i.e., dynamic model or virtual vehicle) rasterized as a box; a past agent trajectory rasterized as a sequence of points with fading brightness; a prediction of obstacles rasterized as a sequence of boxes with fading brightness; a history of obstacles; a color (3-channel) image rendered with surrounding road structures including lanes, intersections, crosswalks, etc.; an intended route rasterized in a constant white color; lanes colored in proportion to known speed limit values; and traffic lights affected lanes colored in different grey levels that are corresponding to different states of traffic lights.

Figure 4:
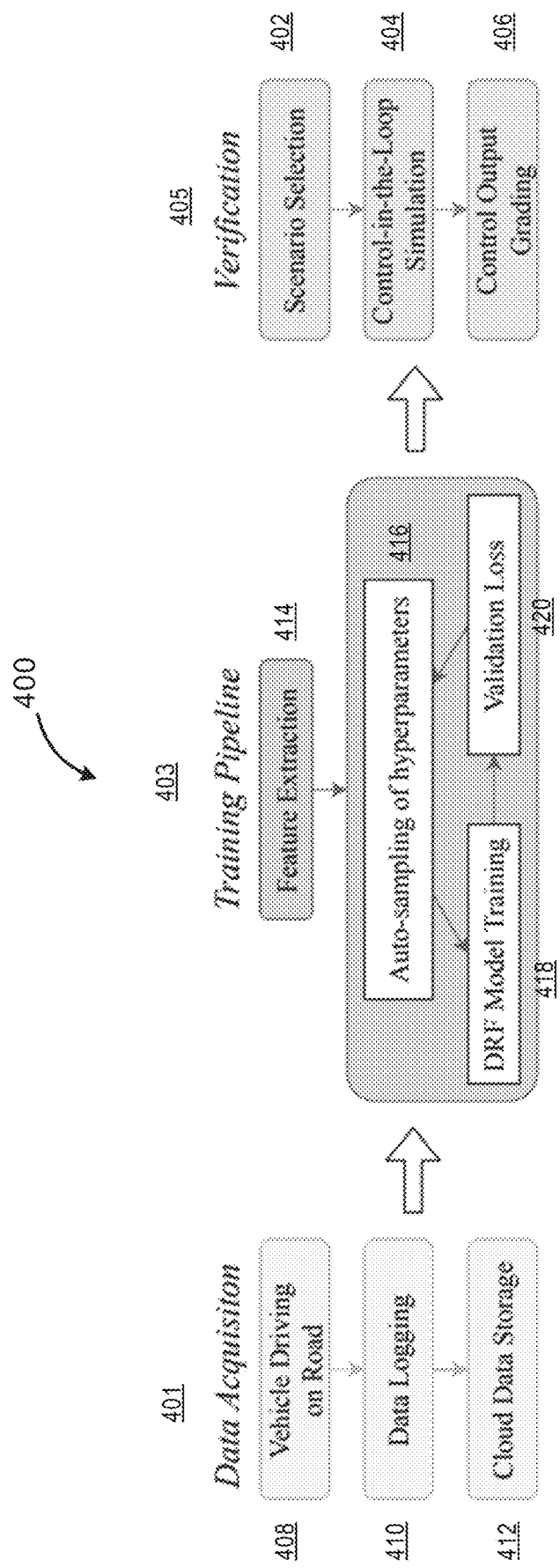
FIG. 4 illustrates a machine learning platform that can be used to train and evaluate a learning-based model in accordance with an embodiment.

FIG. 4 illustrates a machine learning platform 400 that can be used to train and evaluate a learning-based model in accordance with an embodiment.

As shown in FIG. 4, the machine learning platform 400 can include the following three parts: data acquisition 401 that provides data collection from vehicles 408, logging 410, and storage services 412; training pipeline 403 that includes large-scale data processing, feature extraction 414, model training 418, hyperparameter-tuning 416 and offline evaluation 420; and verification 405 that contains scenario selection 402, control-in-the loop simulation 404, and performance grading 406.

Figure 5:
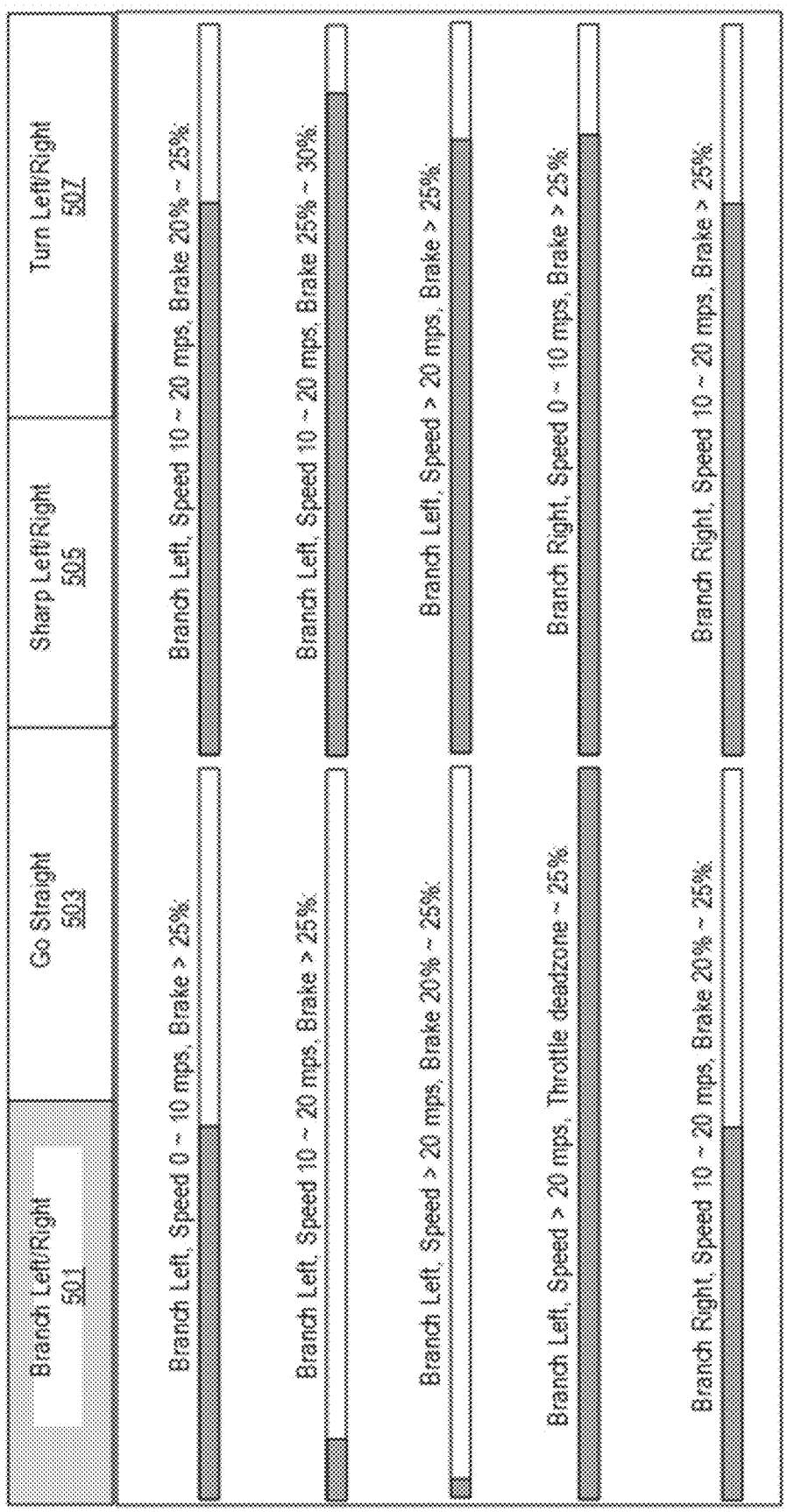
FIG. 5 illustrates an example of a graphical user interface for data acquisition for the machine learning platform illustrated in FIG. 4 according to an embodiment.

In an embodiment, two types of training data can be collected via the data acquisition part. The first type is for dynamic model training and validation, and the second type is for model performance evaluation on continuous trajectories. For the first type of data, either manual driving data or autonomous driving data (as long as throttle/brake/steering behaves under control commands) can be collected via a training data collection graphic user interface (GUI), an example of which can be shown in FIG. 5, where progress bars are used to indicate the collection progress of a specific category, and where training data for different driving scenarios—Branch Left/Right (2 driving scenarios) 501, Go Straight (503), Sharp Left/Right (2 driving scenarios) 505, and Turn Left/Right (2 driving scenarios) 507—are collected based on the control commands and the vehicle states shown in the figure. Training data collected via the GUI in FIG. 5 can be used to train learning-based models, including the learning-based planner, although the learning-based planner can also be trained using bird's eye view (BEV) image representations with multiple channels by scene rasterization as discussed above.

The second type of training data can include includes information for left/right turns, stop/non-stop and zig-zag trajectories, the combination of which covers normal driving behaviors. Unlike training and validation datasets, evaluation datasets can be continuous time sequential datasets.

In an embodiment, the training pipeline 403 can include a dynamic model (DM), which can model an open loop vehicle dynamics system. Both rule-based and learning-based models can be integrated to the training pipeline 403.

In an embodiment, in the control-in-the-loop simulation component 404, a loop can be formed by perception, prediction, planning, control and localization modules at each time cycle during simulation. The control module can take inputs from an upstream planning module, and generate commands to the dynamic model (i.e. the simulated or virtual vehicle). States and poses of the dynamic model can be updated based on control commands and vehicle states. The outputs of the dynamic model can be fed to a localization module and utilized by simulation for the next time cycle. An accurate dynamic model should behave the same as a real vehicle when being fed with the same inputs.

Figure 6:
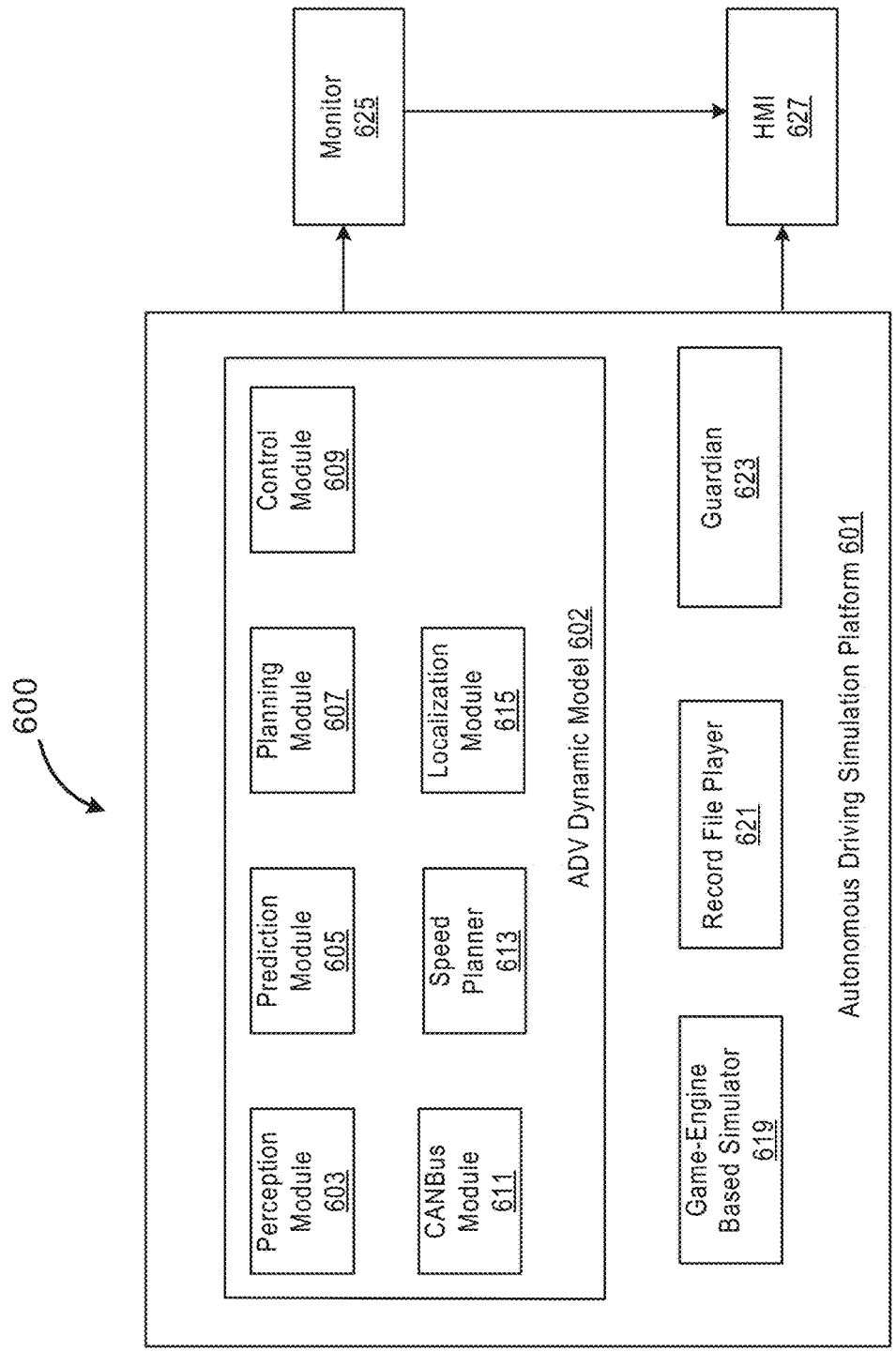
FIG. 6 illustrates an example of an autonomous driving simulation platform for some embodiments of the invention.

FIG. 6 illustrates an example of an autonomous driving simulation platform 600 for some embodiments of the invention.

In one embodiment, the example simulation platform 601 includes a dynamic model 602 of an ADV, a game-engine based simulator 619 and a record file player 621. The game-engine based simulator 619 can provide a 3D virtual world where sensors can perceive and provide precise ground truth data for every piece of an environment. The record file player 621 can replay record files recorded in the real world for use in testing the functions and performance of various modules of the dynamic model 602.

In one embodiment, the ADV dynamic model 602 can be a virtual vehicle that includes a number of core software modules, including a perception module 603, a prediction module 605, a planning module 607, a control module 609, a speed planner module 613, a CAN Bus module 611, and a localization module 615. The functions of these modules are described in detail in FIGS. 8 and 10.

As further shown, the simulation platform 601 can include a guardian module 623, which is a safety module that performs the function of an action center and intervenes when a monitor 625 detects a failure. When all modules work as expected, the guardian module 623 allows the flow of control to work normally. When a crash in one of the modules is detected by the monitor 625, the guardian module 623 can prevent control signals from reaching the CAN Bus 611 and can bring the ADV dynamic model 602 to a stop.

The simulation platform 601 can include a human machine interface (HMI) 627, which is a module for viewing the status of the dynamic model 602, and controlling the dynamic model 602 in real time.

Figure 7:
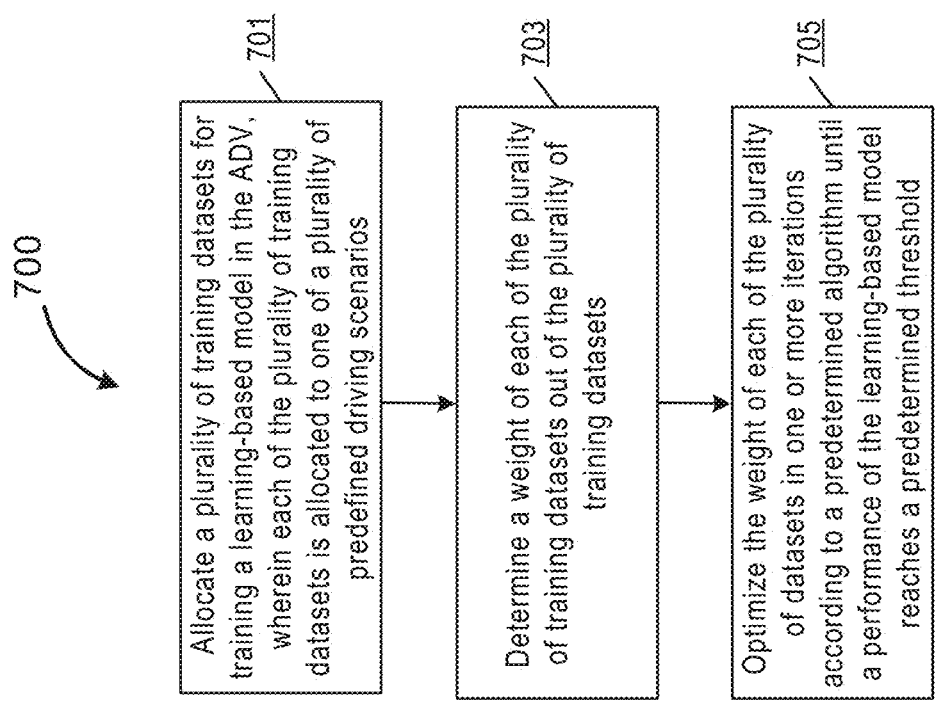
FIG. 7 is a flow chart illustrating a process of formulating training data for an autonomous driving vehicle (ADV).

FIG. 7 is a flow chart illustrating a process 700 of formulating training data for an autonomous driving vehicle (ADV). The process 700 may be performed by processing logic which may include software, hardware, or a combination thereof. For example, the process 700 may be performed by various components and services in the autonomous simulation platform described in FIG. 1.

Referring to FIG. 7, in operation 701, the processing logic allocates a plurality of training datasets for training a learning-based model in the ADV, wherein each of the plurality of training datasets is allocated to one of a plurality of predefined driving scenarios. In operation 703, the processing logic determines a weight of each of the plurality of training datasets out of the plurality of training datasets. In operation 705, the processing logic optimizes the weight of each of the plurality of datasets in one or more iterations according to a predetermined algorithm until a performance of the learning-based model reaches a predetermined threshold.

Automatic Driving Vehicle

Figure 8:
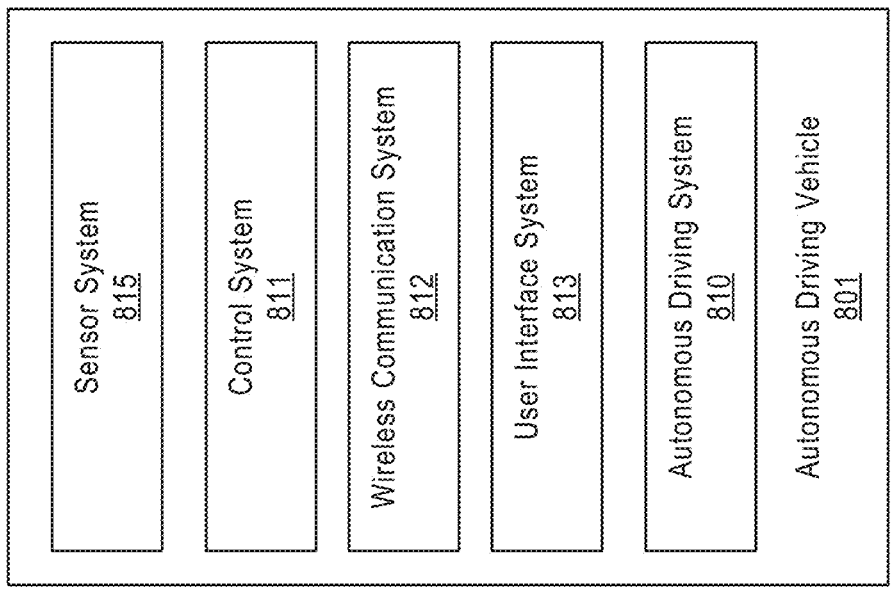
FIG. 8 is a block diagram illustrating an ADV according to one embodiment

FIG. 8 is a block diagram illustrating an autonomous driving vehicle according to one embodiment. Referring to FIG. 8, autonomous driving vehicle 801 may be communicatively coupled to one or more servers over a network, which may be any type of networks such as a local area network (LAN), a wide area network (WAN) such as the Internet, a cellular network, a satellite network, or a combination thereof, wired or wireless. The server(s) may be any kind of servers or a cluster of servers, such as Web or cloud servers, application servers, backend servers, or a combination thereof. A server may be a data analytics server, a content server, a traffic information server, a map and point of interest (MPOI) server, or a location server, etc.

An autonomous driving vehicle refers to a vehicle that can be configured to in an autonomous mode in which the vehicle navigates through an environment with little or no input from a driver. Such an autonomous driving vehicle can include a sensor system having one or more sensors that are configured to detect information about the environment in which the vehicle operates. The vehicle and its associated controller(s) use the detected information to navigate through the environment. Autonomous driving vehicle 801 can operate in a manual mode, a full autonomous mode, or a partial autonomous mode.

In one embodiment, autonomous driving vehicle 801 includes, but is not limited to, autonomous driving system (ADS) 810, vehicle control system 811, wireless communication system 812, user interface system 813, and sensor system 815. Autonomous driving vehicle 801 may further include certain common components included in ordinary vehicles, such as, an engine, wheels, steering wheel, transmission, etc., which may be controlled by vehicle control system 811 and/or ADS 810 using a variety of communication signals and/or commands, such as, for example, acceleration signals or commands, deceleration signals or commands, steering signals or commands, braking signals or commands, etc.

Components 810-815 may be communicatively coupled to each other via an interconnect, a bus, a network, or a combination thereof. For example, components 810-815 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 9:
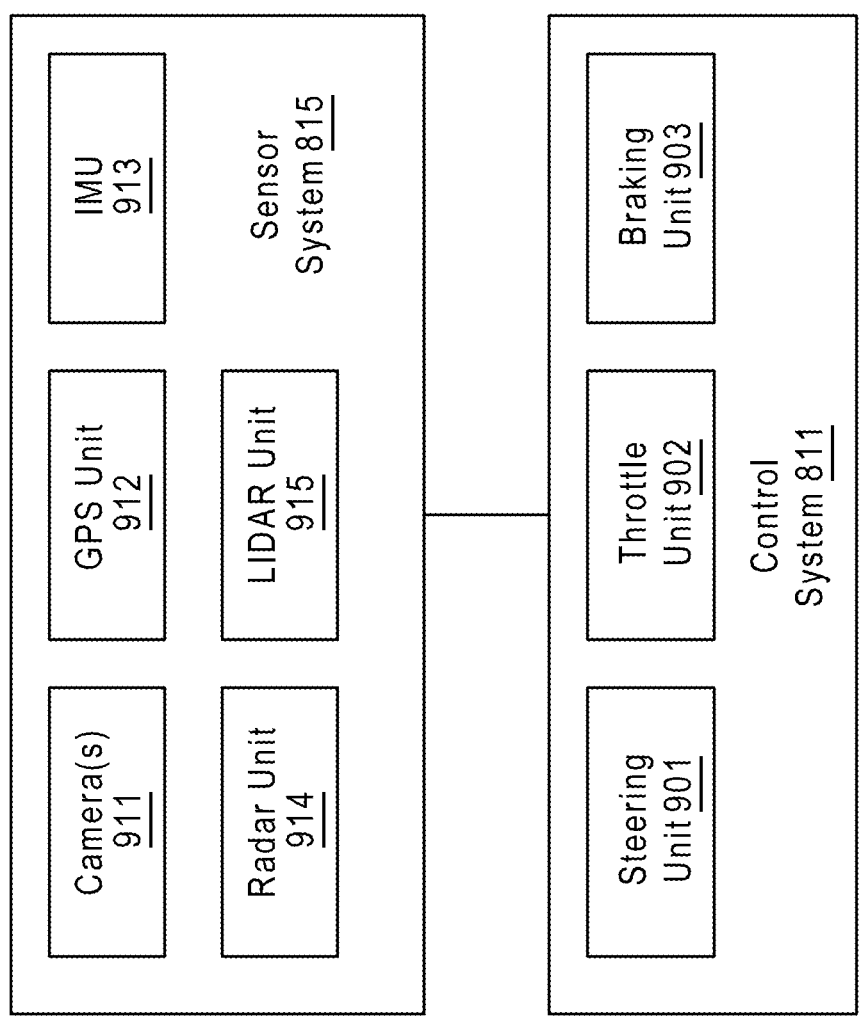
FIG. 9 is a block diagram illustrating a control system of the ADV according to one embodiment

Referring now to FIG. 9, in one embodiment, sensor system 815 includes, but it is not limited to, one or more cameras 911, global positioning system (GPS) unit 912, inertial measurement unit (IMU) 913, radar unit 914, and a light detection and range (LIDAR) unit 915. GPS system 912 may include a transceiver operable to provide information regarding the position of the autonomous driving vehicle. IMU unit 913 may sense position and orientation changes of the autonomous driving vehicle based on inertial acceleration. Radar unit 914 may represent a system that utilizes radio signals to sense objects within the local environment of the autonomous driving vehicle. In some embodiments, in addition to sensing objects, radar unit 914 may additionally sense the speed and/or heading of the objects. LIDAR unit 915 may sense objects in the environment in which the autonomous driving vehicle is located using lasers. LIDAR unit 915 could include one or more laser sources, a laser scanner, and one or more detectors, among other system components. Cameras 911 may include one or more devices to capture images of the environment surrounding the autonomous driving vehicle. Cameras 911 may be still cameras and/or video cameras. A camera may be mechanically movable, for example, by mounting the camera on a rotating and/or tilting a platform.

Sensor system 815 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous driving vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 811 includes, but is not limited to, steering unit 901, throttle unit 902 (also referred to as an acceleration unit), and braking unit 903. Steering unit 901 is to adjust the direction or heading of the vehicle. Throttle unit 902 is to control the speed of the motor or engine that in turn controls the speed and acceleration of the vehicle. Braking unit 903 is to decelerate the vehicle by providing friction to slow the wheels or tires of the vehicle. Note that the components as shown in FIG. 9 may be implemented in hardware, software, or a combination thereof.

Referring back to FIG. 8, wireless communication system 812 is to allow communication between autonomous driving vehicle 801 and external systems, such as devices, sensors, other vehicles, etc. For example, wireless communication system 812 can wirelessly communicate with one or more devices directly or via a communication network. Wireless communication system 812 can use any cellular communication network or a wireless local area network (WLAN), e.g., using WiFi to communicate with another component or system. Wireless communication system 812 could communicate directly with a device (e.g., a mobile device of a passenger, a display device, a speaker within vehicle 801), for example, using an infrared link, Bluetooth, etc. User interface system 813 may be part of peripheral devices implemented within vehicle 801 including, for example, a keyboard, a touch screen display device, a microphone, and a speaker, etc.

Some or all of the functions of autonomous driving vehicle 801 may be controlled or managed by ADS 810, especially when operating in an autonomous driving mode. ADS 810 includes the necessary hardware (e.g., processor(s), memory, storage) and software (e.g., operating system, planning and routing programs) to receive information from sensor system 815, control system 811, wireless communication system 812, and/or user interface system 813, process the received information, plan a route or path from a starting point to a destination point, and then drive vehicle 801 based on the planning and control information. Alternatively, ADS 810 may be integrated with vehicle control system 811.

For example, a user as a passenger may specify a starting location and a destination of a trip, for example, via a user interface. ADS 810 obtains the trip related data. For example, ADS 810 may obtain location and route data from an MPOI server. The location server provides location services and the MPOI server provides map services and the POIs of certain locations. Alternatively, such location and MPOI information may be cached locally in a persistent storage device of ADS 810.

While autonomous driving vehicle 801 is moving along the route, ADS 810 may also obtain real-time traffic information from a traffic information system or server (TIS). Note that the servers may be operated by a third party entity. Alternatively, the functionalities of the servers may be integrated with ADS 810. Based on the real-time traffic information, MPOI information, and location information, as well as real-time local environment data detected or sensed by sensor system 815 (e.g., obstacles, objects, nearby vehicles), ADS 810 can plan an optimal route and drive vehicle 801, for example, via control system 811, according to the planned route to reach the specified destination safely and efficiently.

Figure 10:
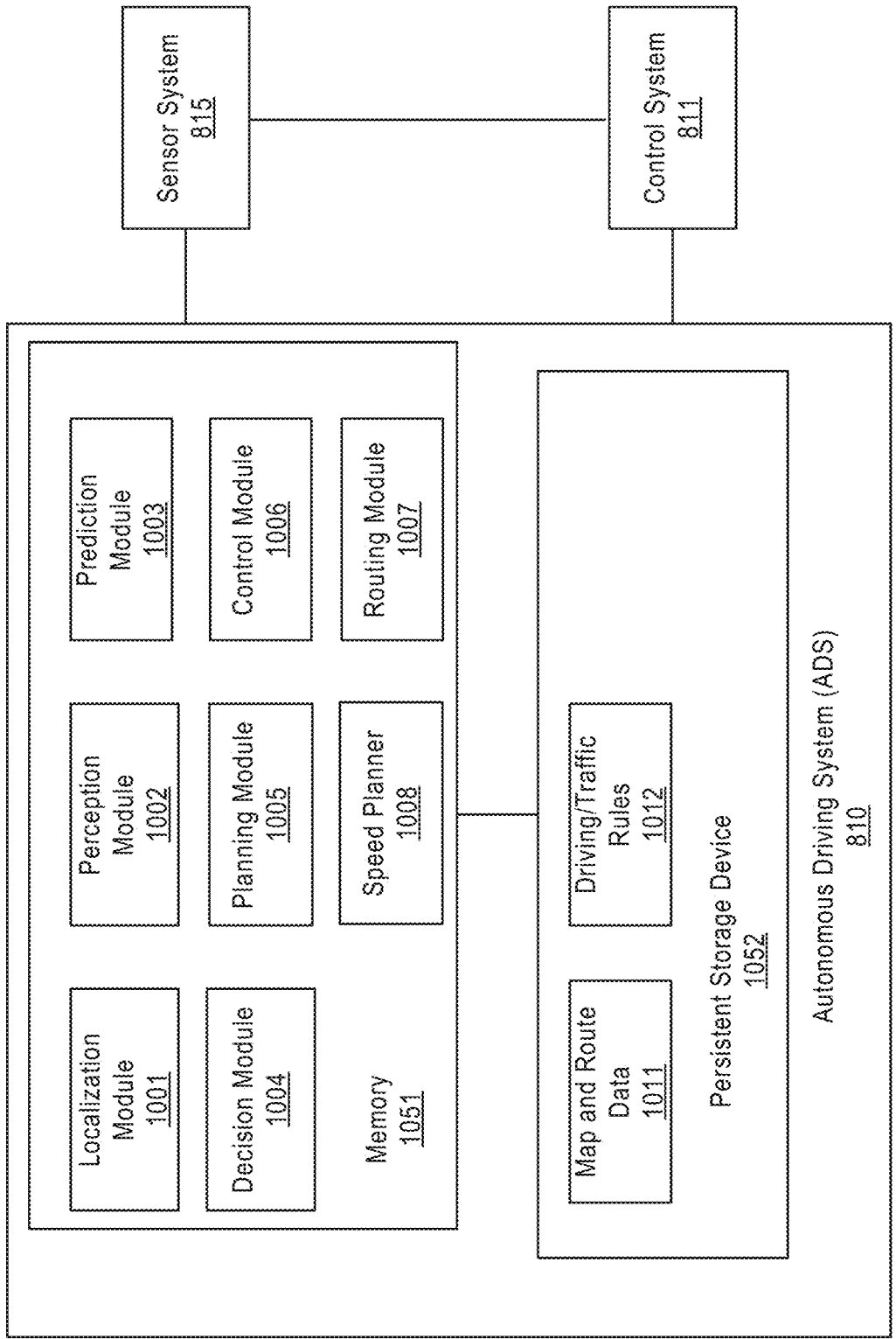
FIG. 10 is a block diagram illustrating an example of the autonomous driving system of the ADV according to one embodiment.

FIG. 10 is a block diagram illustrating an example of the autonomous driving system 810 according to one embodiment. The autonomous driving system 810 may be implemented as a part of autonomous driving vehicle 801 of FIG. 8 including, but is not limited to, ADS 810, control system 811, and sensor system 815.

Referring to FIG. 10, ADS 810 includes, but is not limited to, localization module 1001, perception module 1002, prediction module 1003, decision module 1004, planning module 1005, control module 1006, routing module 1007, speed planner module 1008. These modules and the modules described in FIG. 6 perform similar functions.

Some or all of modules 1001-1008 may be implemented in software, hardware, or a combination thereof. For example, these modules may be installed in persistent storage device 1052, loaded into memory 1051, and executed by one or more processors (not shown). Note that some or all of these modules may be communicatively coupled to or integrated with some or all modules of vehicle control system 811 of FIG. 9. Some of modules 1001-1008 may be integrated together as an integrated module.

Localization module 1001 determines a current location of autonomous driving vehicle 801 (e.g., leveraging GPS unit 912) and manages any data related to a trip or route of a user. Localization module 1001 (also referred to as a map and route module) manages any data related to a trip or route of a user. A user may log in and specify a starting location and a destination of a trip, for example, via a user interface. Localization module 1001 communicates with other components of autonomous driving vehicle 801, such as map and route data 1011, to obtain the trip related data. For example, localization module 1001 may obtain location and route data from a location server and a map and POI (MPOI) server. A location server provides location services and an MPOI server provides map services and the POIs of certain locations, which may be cached as part of map and route data 1011. While autonomous driving vehicle 801 is moving along the route, localization module 1001 may also obtain real-time traffic information from a traffic information system or server.

Based on the sensor data provided by sensor system 815 and localization information obtained by localization module 1001, a perception of the surrounding environment is determined by perception module 1002. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 1002 may include a computer vision system or functionalities of a computer vision system to process and analyze images captured by one or more cameras in order to identify objects and/or features in the environment of autonomous driving vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 1002 can also detect objects based on other sensors data provided by other sensors such as a radar and/or LIDAR.

For each of the objects, prediction module 1003 predicts what the object will behave under the circumstances. The prediction is performed based on the perception data perceiving the driving environment at the point in time in view of a set of map/rout information 1011 and traffic rules 1012. For example, if the object is a vehicle at an opposing direction and the current driving environment includes an intersection, prediction module 1003 will predict whether the vehicle will likely move straight forward or make a turn. If the perception data indicates that the intersection has no traffic light, prediction module 1003 may predict that the vehicle may have to fully stop prior to enter the intersection. If the perception data indicates that the vehicle is currently at a left-turn only lane or a right-turn only lane, prediction module 1003 may predict that the vehicle will more likely make a left turn or right turn respectively.

For each of the objects, decision module 1004 makes a decision regarding how to handle the object. For example, for a particular object (e.g., another vehicle in a crossing route) as well as its metadata describing the object (e.g., a speed, direction, turning angle), decision module 1004 decides how to encounter the object (e.g., overtake, yield, stop, pass). Decision module 1004 may make such decisions according to a set of rules such as traffic rules or driving rules 1012, which may be stored in persistent storage device 1052.

Routing module 1007 is configured to provide one or more routes or paths from a starting point to a destination point. For a given trip from a start location to a destination location, for example, received from a user, routing module 1007 obtains route and map information 1011 and determines all possible routes or paths from the starting location to reach the destination location. Routing module 1007 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 1004 and/or planning module 1005. Decision module 1004 and/or planning module 1005 examine all of the possible routes to select and modify one of the most optimal routes in view of other data provided by other modules such as traffic conditions from localization module 1001, driving environment perceived by perception module 1002, and traffic condition predicted by prediction module 1003. The actual path or route for controlling the ADV may be close to or different from the reference line provided by routing module 1007 dependent upon the specific driving environment at the point in time.

Based on a decision for each of the objects perceived, planning module 1005 plans a path or route for the autonomous driving vehicle, as well as driving parameters (e.g., distance, speed, and/or turning angle), using a reference line provided by routing module 1007 as a basis. That is, for a given object, decision module 1004 decides what to do with the object, while planning module 1005 determines how to do it. For example, for a given object, decision module 1004 may decide to pass the object, while planning module 1005 may determine whether to pass on the left side or right side of the object. Planning and control data is generated by planning module 1005 including information describing how vehicle 1001 would move in a next moving cycle (e.g., next route/path segment). For example, the planning and control data may instruct vehicle 801 to move 10 meters at a speed of 30 miles per hour (mph), then change to a right lane at the speed of 25 mph.

Speed planner 1008 can be part of planning module 1005 or a separate module. Given a planned trajectory, speed planner 1008 guides the ADV to traverse along the planned path with a sequence of proper speeds $v=[v_i, \ldots]$, $i \in [0, N]$, where $v_i = ds_i/dt$ and $ds_i$ is the traverse distance along the path at t=i and dt is the sampling time.

Based on the planning and control data, control module 1006 controls and drives the autonomous driving vehicle, by sending proper commands or signals to vehicle control system 811, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 1005 plans a next route segment or path segment, for example, including a target position and the time required for the ADV to reach the target position. Alternatively, planning module 1005 may further specify the specific speed, direction, and/or steering angle, etc. In one embodiment, planning module 1005 plans a route segment or path segment for the next predetermined period of time such as 5 seconds. For each planning cycle, planning module 1005 plans a target position for the current cycle (e.g., next 5 seconds) based on a target position planned in a previous cycle. Control module 1006 then generates one or more control commands (e.g., throttle, brake, steering control commands) based on the planning and control data of the current cycle.

Note that decision module 1004 and planning module 1005 may be integrated as an integrated module. Decision module 1004/planning module 1005 may include a navigation system or functionalities of a navigation system to determine a driving path for the autonomous driving vehicle.

For example, the navigation system may determine a series of speeds and directional headings to affect movement of the autonomous driving vehicle along a path that substantially avoids perceived obstacles while generally advancing the autonomous driving vehicle along a roadway-based path leading to an ultimate destination. The destination may be set according to user inputs via user interface system 813. The navigation system may update the driving path dynamically while the autonomous driving vehicle is in operation. The navigation system can incorporate data from a GPS system and one or more maps so as to determine the driving path for the autonomous driving vehicle.

According to one embodiment, a system architecture of an autonomous driving system as described above includes, but it is not limited to, an application layer, a planning and control (PNC) layer, a perception layer, a device driver layer, a firmware layer, and a hardware layer. The application layer may include user interface or configuration application that interacts with users or passengers of an autonomous driving vehicle, such as, for example, functionalities associated with user interface system 813. The PNC layer may include functionalities of at least planning module 1005 and control module 1006. The perception layer may include functionalities of at least perception module 1002. In one embodiment, there is an additional layer including the functionalities of prediction module 1003 and/or decision module 1004. Alternatively, such functionalities may be included in the PNC layer and/or the perception layer. The firmware layer may represent at least the functionality of sensor system 815, which may be implemented in a form of a field programmable gate array (FPGA). The hardware layer may represent the hardware of the autonomous driving vehicle such as control system 811. The application layer, PNC layer, and perception layer can communicate with the firmware layer and hardware layer via the device driver layer.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of formulating training data for an autonomous driving vehicle (ADV), comprising:
allocating, by a tuner core, a plurality of training datasets for training a learning-based model in the ADV, wherein each of the plurality of training datasets is allocated to one of a plurality of predefined driving scenarios, wherein the learning-based model includes a convolutional neural network (CNN) backbone with a branch of attention module, a long short term memory (LSTM) decoder, and a differential rasterizer module, wherein the LSTM decoder receives feature embeddings from the CNN backbone and generates output planned trajectories of the ADV in a time domain, and the differential rasterizer rasterizes the output planned trajectories of the ADV into images that are applied to a loss function;
determining, by the tuner core, a weight of each of the plurality of training datasets out of the plurality of training datasets; and
determining an amount of training data of each of the plurality of training datasets by optimizing, by the tuner core, the weight of each of the plurality of datasets in one or more iterations according to a predetermined algorithm which includes one of a random search algorithm, a grid search algorithm, or a Bayesian algorithm, until a performance of the learning-based model reaches a predetermined threshold, wherein each weight is associated with the amount of training data of a corresponding one of the plurality of training datasets relative to the amount of training data of remaining training dataset;

performing a simulation that evaluates the learning-based model using with a dynamic model of the ADV based on performance of the learning-based model in each of the predefined driving scenarios, including determining a comfort score of the learning-based model in the performed simulation based at least on a jerk ratio;

feeding training data from the simulation into the training datasets; and in response to an increase in the amount of training data of one of the plurality of training datasets, increasing the amount of training data of the remaining training datasets to maintain the respective ratio of each of the plurality of training datasets.

2. The computer-complemented method of claim 1, wherein each of one or more iterations comprises:

receiving, by the tuner core, a performance score of the learning-based model that is trained using the plurality of training datasets;

comparing, by the tuner core, the performance score against the predetermined threshold; and in response to determining that the performance score is less than the predetermined threshold, adjusting the weight of each of one or more of the plurality of training datasets.

3. The computer-implemented method of claim 1, wherein performing the simulation further comprises determining a safety score of the learning-based model in the performed simulation based at least on a collision, a traffic-light violation, or speeding, in the simulation.

4. The computer-implemented method of claim 1, wherein each of the plurality of driving scenarios is defined by map information, traffic conditions, driving behaviors of an ego vehicle, and driving behaviors of surrounding vehicles.

5. The computer-implemented method of claim 1, wherein the plurality of driving scenarios are classified into a plurality of categories, including cruising, junction, static interaction scenario, and dynamic interaction.

6. The computer-implemented method of claim 1, wherein inputs for each of the plurality of driving scenarios to the learning-based model includes a bird's eye view (BEV) representation with multiple channels by scene rasterization.

7. A non-transitory machine-readable medium having instructions stored therein, which when executed by a processor of a tuner core, cause the processor to perform operations of formulating training data for an autonomous driving vehicle (ADV), comprising:

allocating a plurality of training datasets for training a learning-based model in the ADV, wherein each of the plurality of training datasets is allocated to one of a plurality of predefined driving scenarios, wherein the learning-based model includes a convolutional neural network (CNN) backbone with a branch of attention module, a long short term memory (LSTM) decoder, and a differential rasterizer module, wherein the LSTM decoder receives feature embeddings from the CNN backbone and generates output planned trajectories of the ADV in a time domain, and the differential rasterizer rasterizes the output planned trajectories of the ADV into images that are applied to a loss function;

determining a weight of each of the plurality of training datasets out of the plurality of training datasets;

determining an amount of training data of each of the plurality of training datasets by optimizing the weight of each of the plurality of datasets in one or more iterations according to a predetermined algorithm which includes one of a random search algorithm, a grid search algorithm, or a Bayesian algorithm, until a performance of the learning-based model reaches a predetermined threshold, wherein each weight is associated with the amount of training data of a corresponding one of the plurality of training datasets relative to the amount of training data of remaining training datasets;

performing a simulation that evaluates the learning-based model using with a dynamic model of the ADV based on performance of the learning-based model in each of the predefined driving scenarios, including determining a comfort score of the learning-based model in the performed simulation based at least on a jerk ratio;

feeding training data from the simulation into the training datasets; and in response to an increase in the amount of training data of one of the plurality of training datasets, increasing the amount of training data of the remaining training datasets to maintain the respective ratio of each of the plurality of training datasets.

8. The non-transitory machine-readable medium of claim 7, wherein each of the one or more iterations comprises:

receiving a performance score of the learning-based model that is trained using the plurality of training datasets;

comparing the performance score against the predetermine threshold; and in response to determining that the performance score is less than the predetermined threshold, adjusting the weight of each of one or more of the plurality of training datasets.

9. The non-transitory machine-readable medium of claim 7, wherein performing the simulation further comprises determining a safety score of the learning-based model in the performed simulation based at least on a collision, a traffic-light violation, or speeding, in the simulation.

10. The non-transitory machine-readable medium of claim 7, wherein each of the plurality of driving scenarios is defined by map information, traffic conditions, driving behaviors of an ego vehicle, and driving behaviors of surrounding vehicles.

11. The non-transitory machine-readable medium of claim 7, wherein the plurality of driving scenarios are classified into a plurality of categories, including cruising, junction, static interaction scenario, and dynamic interaction.

12. The non-transitory machine-readable medium of claim 7, wherein inputs for each of the plurality of driving scenarios to the learning-based model includes a bird's eye view (BEV) representation with multiple channels by scene rasterization.

13. A data processing system, comprising:
a processor; and a memory coupled to the processor to store instructions, which when executed by the processor, cause the processor to perform operations, the operations including:

allocating a plurality of training datasets for training a learning-based model in an autonomous driving vehicle (ADV), wherein each of the plurality of training datasets is allocated to one of a plurality of predefined driving scenarios, wherein the learning-based model includes a convolutional neural network (CNN) backbone with a branch of attention module, a long short term memory (LSTM) decoder, and a differential rasterizer module, wherein the LSTM decoder receives feature embeddings from the CNN backbone and generates output planned trajectories of the ADV in a time domain, and the differential rasterizer rasterizes the output planned trajectories of the ADV into images that are applied to a loss function;

determining a weight of each of the plurality of training datasets out of the plurality of training datasets;

determining an amount of training data of each of the plurality of training datasets by optimizing the weight of each of the plurality of datasets in one or more iterations according to a predetermined algorithm which includes one of a random search algorithm, a grid search algorithm, or a Bayesian algorithm, until a performance of the learning-based model reaches a predetermined threshold, wherein each weight is associated with the amount of training data of a corresponding one of the plurality of training datasets relative to the amount of training data of remaining training datasets;

performing a simulation that evaluates the learning-based model using with a dynamic model of the ADV based on performance of the learning-based model in each of the predefined driving scenarios, including determining a comfort score of the learning-based model in the performed simulation based at least on a jerk ratio;

feeding training data from the simulation into the training datasets; and in response to an increase in the amount of training data of one of the plurality of training datasets, increasing the amount of training data of the remaining training datasets to maintain the respective ratio of each of the plurality of training datasets.

14. The data processing system claim 13, wherein each of the one or more iterations comprises:

receiving a performance score of the learning-based model that is trained using the plurality of training datasets;

comparing the performance score against the predetermined threshold; and in response to determining that the performance score is less than the predetermined threshold, adjusting the weight of each of one or more of the plurality of training datasets.

15. The data processing system claim 13, wherein performing the simulation further comprises determining a safety score of the learning-based model in the performed simulation based at least on a collision, a traffic-light violation, or speeding, in the simulation.

16. The data processing system claim 13, wherein each of the plurality of driving scenarios is defined by map information, traffic conditions, driving behaviors of an ego vehicle, and driving behaviors of surrounding vehicles.

17. The data processing system claim 13, wherein the plurality of driving scenarios are classified into a plurality of categories, including cruising, junction, static interaction scenario, and dynamic interaction.

* * * * *